United States Patent [19]

Klein

[11] Patent Number: 5,664,140
[45] Date of Patent: Sep. 2, 1997

[54] PROCESSOR TO MEMORY INTERFACE LOGIC FOR USE IN A COMPUTER SYSTEM USING A MULTIPLEXED MEMORY ADDRESS

[75] Inventor: Dean A. Klein, Lake City, Minn.

[73] Assignee: Micron Electronics, Inc., Nampa, Id.

[21] Appl. No.: 444,750

[22] Filed: May 19, 1995

[51] Int. Cl.$^6$ ..................................................... G06F 12/02
[52] U.S. Cl. ................ 711/211; 365/230.02; 365/230.08
[58] Field of Search ................. 395/421.01; 365/230.02, 365/230.08

[56] References Cited

U.S. PATENT DOCUMENTS

| | | | |
|---|---|---|---|
| 5,124,560 | 6/1992 | Fueki | 250/492.2 |
| 5,157,692 | 10/1992 | Horie et al. | 375/260 |
| 5,175,854 | 12/1992 | Cheung et al. | 395/650 |
| 5,191,581 | 3/1993 | Woodbury et al. | 370/85.9 |
| 5,305,443 | 4/1994 | Franzo | 395/306 |
| 5,526,513 | 6/1996 | Cerutti | 395/421.01 |

*Primary Examiner*—Eddie P. Chan
*Assistant Examiner*—Reginald G. Bragdon
*Attorney, Agent, or Firm*—Dorsey & Whitney LLP

[57] ABSTRACT

Interface logic for interfacing a processor to a memory unit is disclosed. The interface logic in one embodiment of the present invention uses a single port to both receive an address from the processor and drive a multiplexed address to the memory unit. By causing the processor to relinquish control of the address bus, the interface logic can drive an address over the same lines used by the processor to communicate the address to the interface logic. This procedure eliminates the need for two ports, and therefore reduces the pin count of the interface logic. For example, in a non-paging implementation, an interface bus is connected to a row portion of the address bus. The processor drives the row address over the row portion of the address bus and thereby also over the interface bus to the memory unit. The interface logic (1) stores the column address that is placed on the address bus by the processor, (2) causes the processor to relinquish control of the address bus after the processor has driven the row address to the memory unit, and then (3) drives the column address over the row portion of the address bus and thereby also over the interface bus to the memory unit address port.

22 Claims, 5 Drawing Sheets

*Fig.1*

PRIOR ART

PROCESSOR TO MEMORY INTERFACE LOGIC FOR USE IN A COMPUTER SYSTEM USING A MULTIPLEXED MEMORY ADDRESS

FIELD OF THE INVENTION

The present invention relates to interface logic for addressing a memory unit with a multiplexed address. Specifically, the present invention relates to interface logic that is more efficient and less costly than the interface logic of the prior art.

BACKGROUND OF THE INVENTION

Figure 1:
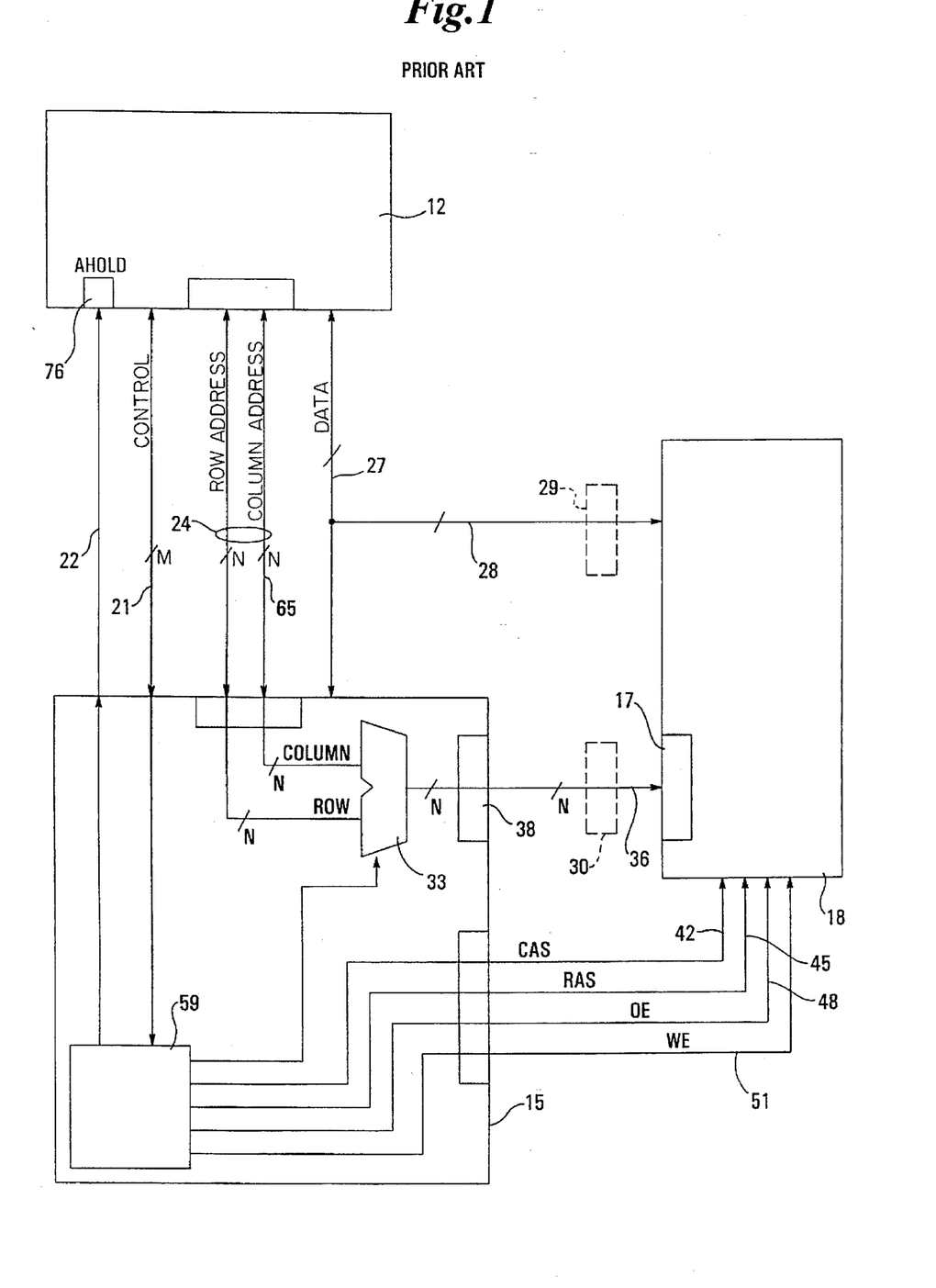
FIG. 1 is schematic diagram of a processor to memory interface system of the prior art.

FIG. 1 shows a system of the prior art with a processor 12, interface logic 15, and a memory unit 18. The processor 12 addresses the memory unit 18 using memory address multiplexing where each memory address comprises a row address and a column address. The addressing is "multiplexed" in the sense that the memory unit 18 accepts the row address and the column address sequentially rather than simultaneously.

A cycle begins with the processor 12 placing an address on the address bus 24, and control signals on the control bus 21. If the interface logic 15 determines that the cycle is a memory cycle, the state machine 59 selects the row portion of the address applied to the multiplexer 33 and communicates this row address over port 38 to the memory device address port 17. The state machine 59 asserts the RAS control signal 45 to strobe the row address into the memory device 18. The row address is then removed from the address port 17, and the column portion of the address is selected and presented to the address port 17 over bus 36. The state machine 59 then asserts the CAS control signal 42, thereby strobing the column address into the memory device 18.

Depending on whether the memory cycle is a read or write operation, either the output enable (OE) signal 48 or the write enable (WE) signal 51 is appropriately asserted by the state machine 59. During a write operation, data is moved from the data bus 27 to the memory unit 18. During a read operation, data is moved from the memory unit 18 to the data bus 27. Optional transceivers 29 and 30 can be used to buffer information being transferred to and from the memory unit 18. Transceiver 29 buffers data being transferred on the bus 28 between the data bus 27 and the memory unit 18. Transceiver 30 buffers the address being transferred on the bus 36 from the interface logic 15 to the memory unit 18.

Thus, in the system of FIG. 1, the interface logic 15 accepts the full address from the address lines 24 and sequentially communicates the corresponding multiplexed address portions over the port 38 and bus 36. The interface logic 15 of FIG. 1 is relatively complicated because it must accept the full address on one set of inputs and deliver the multiplexed address to the memory unit 18 over port 38. This complexity adds to the pin requirements or pin count and physical size of the interface logic 15. Accordingly, there exists a need to reduce the pin count (i.e., cost) of the interface logic 15 without any sacrifice in performance, but while also retaining full compatibility with the processor 12, the memory unit 18, and their associated protocol.

SUMMARY OF THE INVENTION

The present invention relates to interface logic for interfacing a processor to a memory unit that uses multiplexed memory addressing. The interface logic is connected to the processor by an address bus, and an interface bus connects the memory unit to at least a portion of the address bus.

In a non-page mode implementation, the interface bus is preferably connected to a row portion of the address bus. The memory unit is addressed by presenting a row address to the memory unit address port, and then presenting a column address to the address port. The processor drives the row address over the row portion of the addresses bus and thereby also over the interface bus to the memory unit. The interface logic (1) stores the column address that is placed on the address bus by the processor, (2) causes the processor to relinquish control of the address bus after the processor has driven the row address to the memory unit, and then (3) drives the column address over the row portion of the address bus and thereby also over the interface bus to the memory unit address port.

In a page mode implementation, the interface bus is connected to a column portion of the address bus. The operation of the invention in a page mode implementation depends on whether the address placed on the address bus by the processor represents a page miss or a page hit situation. In a page miss situation, the interface logic (1) stores both the row and column addresses, (2) causes the processor to relinquish control of the address bus, (3) drives the row address over the column address portion of the address bus and thereby also over the interface bus to the address port of the memory unit, and then (4) drives the column address over the column address portion of the address bus and thereby also over the interface bus to the address port of the memory unit. The interface logic may strobe the row and column addresses to the memory unit by asserting RAS and CAS signals.

For a page hit situation, the processor drives the column address over the column portion of the address bus and thereby also over the interface bus to the address port. The interface logic may strobe this column address to the memory unit with a CAS signal.

DETAILED DESCRIPTION

Figure 2:
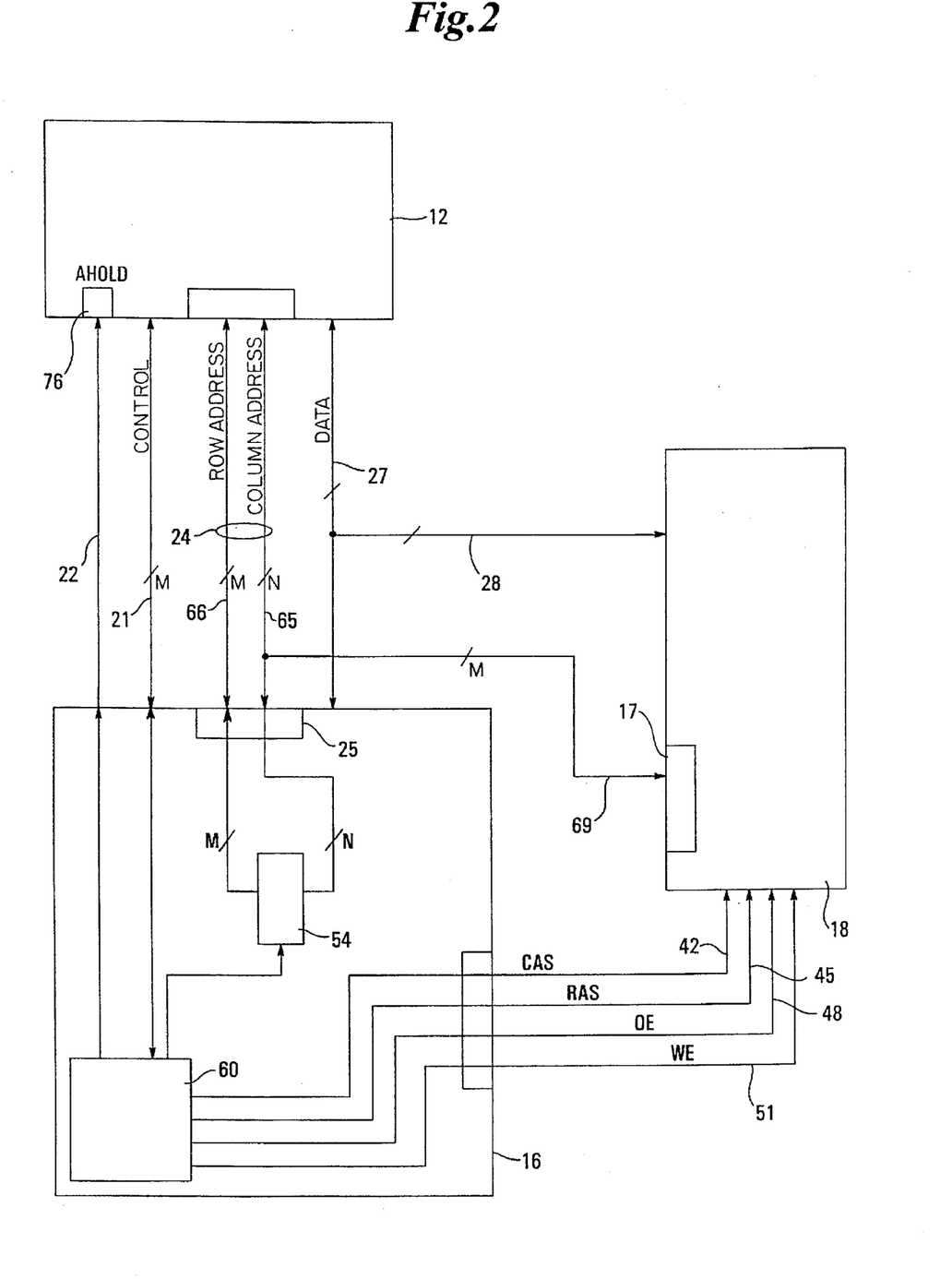
FIG. 2 is schematic diagram of a processor to memory interface system in one embodiment of the present invention.

FIG. 2 is a simplified yet illustrative embodiment of the present invention including a processor 12, a memory unit 18, a control bus 21, an address bus 24, and a data bus 27. As in FIG. 1, the processor 12 addresses the memory unit 18 using memory address multiplexing where each memory address comprises a row address and a column address. The row address is presented to the memory trait 18 prior to the column address being presented to the memory unit 18 so that the row address and the column address are presented to the memory unit 18 in a sequential manner. The busses 65 and 66 are the column and row address busses, respectively. These busses are often the same width, so the values of M and N are typically equal.

The system shown in FIG. 2 has an interface bus 69 linking the row portion 66 of the address bus 24 to the memory unit 18. The address port 38 in the system of FIG. 1 is not present in the embodiment of FIG. 2.

A memory cycle begins in the system of FIG. 2 with the processor 12 placing control signals on the control bus 21 and an address on the address bus 24. The row portion of the address is on the row address bus 66, which is connected to the interface bus 69. The interface bus 69 therefore communicates the row address from the processor to the memory device address port 17. Meanwhile, the column address from the column address bus 69 is stored in latch 54 and the state machine 60 asserts the RAS control signal 45 so that the row address is strobed to the memory unit 18. The latch 54 can be any hardware that stores, latches, or otherwise holds the column address in whatever fashion.

After the row address is strobed to the memory unit 18, the state machine 60 causes the processor 12 to relinquish control of the address bus 24. The interface logic 16 can carry out this task by taking advantage of an "address hold" command available with many modern processors. Issuing the "address hold" command to the processor 12 forces the processor 12 to tri-state its address bus 24. When the address bus 24 is in this "tri-state" condition, the address bus 24 is effectively disconnected from the processor 12. This allows other hardware to drive the address bus 24. In FIG. 2, the processor 12 has an "AHOLD" pin 76 that is used for issuing the "address hold" command to the processor 12.

Once the processor 12 has relinquished control of the address bus 24, the interface logic 16 drives the column address stored in the latch 54 over the row portion 66 of the address bus 24, and thereby also over the interface bus 69. The column address is thus presented to the memory unit address port 17. The state machine 60 then asserts the CAS control signal 42 so that the column address is strobed into the memory unit 18.

Thus, in the present invention, both the row address and the column address are, at different times, driven over the row portion 66 of the address bus 24, and thereby also over the interface bus 69. The interface logic 16 and the interface bus 69 of FIG. 2 therefore eliminates the need for the output port 38 used by the interface logic 15 in FIG. 1. In FIG. 2, the address is not driven to the memory unit 18 over an additional output port 38. Instead, both the processor 12 and the interface logic 16 drive portions of the address over the row address bus 66 and the interface bus 69 to the memory unit 18. The processor 12 drives the row address over the row address bus 66 and thereby also over the interface bus 69 to the memory unit 18. The interface logic 16 drives the column address over the row address bus 66 and thereby also over the interface bus 69 to the memory unit 18.

The foregoing procedure is feasible only because it is possible to reuse port 25 both for receiving the column address from the processor 12 and for driving the column address to the memory unit 18. The port 25 (and the address bus 24) can be used in this manner because the "address hold" command provides the ability to force the processor 12 to relinquish control of the address bus 24 during a memory cycle. (This is critical because if the interface logic 16 attempts to drive the address bus 24 when the processor 12 is also driving the address bus 24, the processor 12 and/or the interface logic 16 may be damaged.)

Thus, the interface logic 16 of the present invention is less complicated than that of FIG. 1 in the sense that the interface logic 16 of FIG. 2 does not have the additional output port 38. This reduces the cost of the interface logic 16 and may also reduce its physical size. Yet the interface logic 16 maintains full compatibility with the memory unit 18 and the processor 12.

Figure 3:
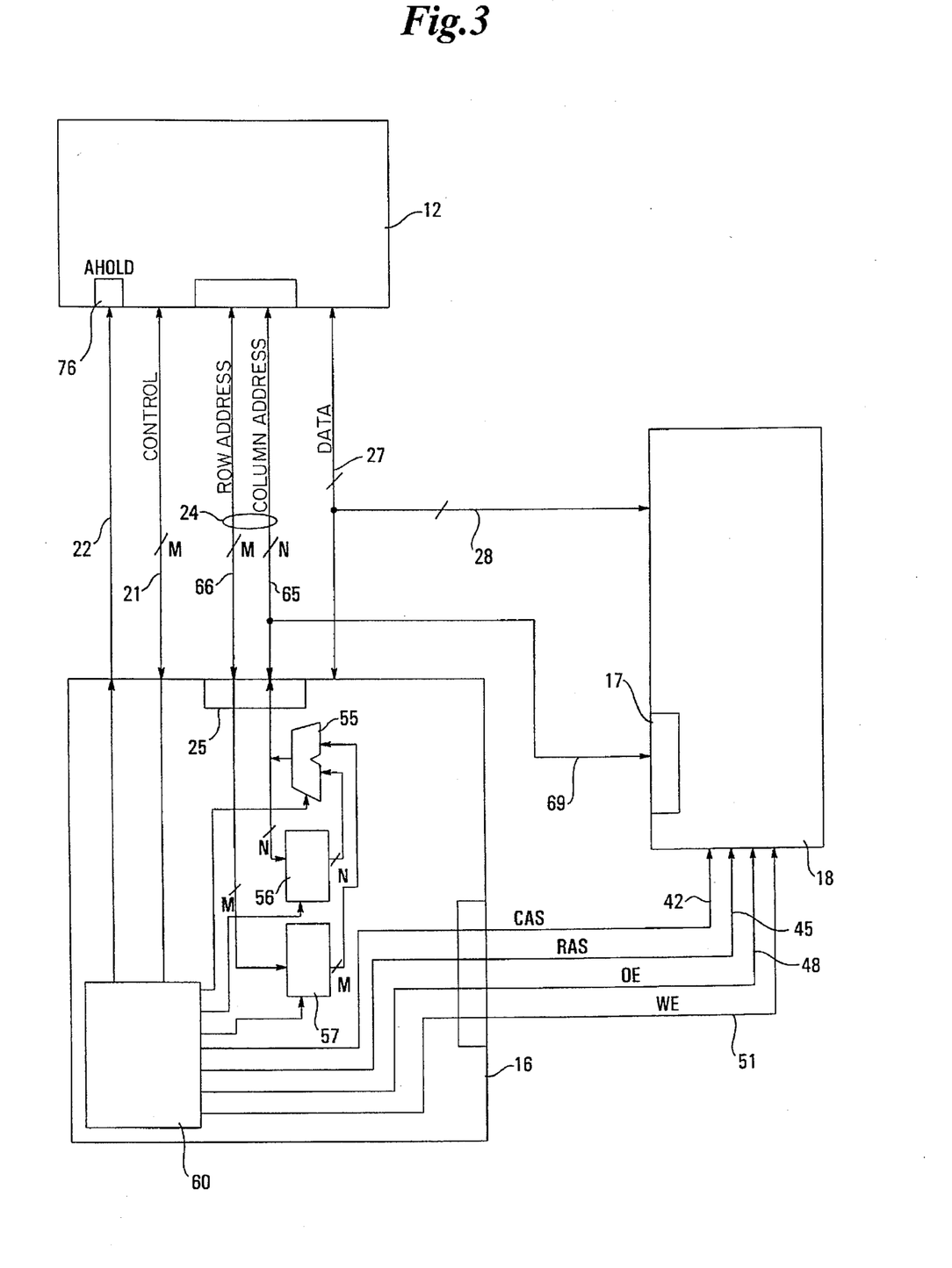
FIG. 3 is schematic diagram of a processor to memory interface system in an embodiment of the present invention where the memory unit operates in page mode.

FIG. 3 shows another embodiment of the present invention in which the memory unit 18 operates in "page mode." In FIG. 3, it is assumed that the row address determines the addressed "page" within memory, and that the column address identifies the addressed location within that page. The operation of the system of FIG. 3 therefore depends on whether the processor 12 begins a memory cycle with an address that is not in the previously-accessed page (a "page miss") or with an address that is within the previously accessed page (a "page hit").

In a page miss situation, the old page address must be replaced by the new page address. This may require that the interface logic 16 remove the RAS signal for an amount of time sufficient to permit the memory unit 18 to "pre-charge." The pre-charge step is required by the memory unit in order to allow the memory unit to prepare for a subsequent memory cycle. The pre-charge time is dependent upon the particular memory unit used and typically ranges from 40–70 nanoseconds.

While the system of FIG. 3 is waiting for this pre-charge time to elapse, the column and row addresses are stored in the latches 56 and 57, respectively. The state machine 60 then causes the processor 12 to relinquish control of the address bus 24. After the processor 12 has relinquished control of the bus 24, the interface logic 16 drives the row address over the column portion 65 of the address bus 24, and thereby also over the interface bus 69 to be presented to the memory unit 18. The state machine 60 strobes the row address to the memory unit 18 by asserting the RAS control signal 45.

After the RAS control signal 45 is removed, the interface logic 16 drives the column address over the column portion 65 of the address bus 24, and thereby also over the interface bus 69. The state machine 60 strobes the column address to the memory unit 18 by asserting the CAS control signal 42.

A page hit operation is carried out when the processor 12 begins a memory cycle with an address that is from the same page as the last memory address. The row address determines the page in the embodiment of FIG. 3, so an address represents a "page hit" when it has the same row address as the previous address. Thus, during a page hit, the row address can be assumed to be the same as the previous row address. For this reason, no pre-charge step is required, and no RAS cycle is needed to present the row address to the memory unit. The column address is immediately presented to the memory unit 18 through a CAS cycle.

Thus, for a page hit situation in the embodiment of FIG. 3, the column address is driven over the column portion 65 of the address bus 69 and then over the interface bus 69 to the memory unit 18. It is preferred that the processor 12 drive the column address bus 65 because such an implementation takes advantage of the nearly direct connection between the processor 12 and the memory unit 18, thereby allowing the address to reach the memory unit 18 quickly. This is typically more efficient than having the interface logic 16 store the column address, tri-state the processor's connection to the address bus 24, and drive the column address over the column busses 65 and 69 to the memory unit 18.

In a page hit operation where the processor 12 drives the column address to the memory unit 18, the interface logic 16 does not cause the processor 12 to relinquish control of the address bus 24. Thus, the interface logic 16 in FIG. 3 asserts the AHOLD command only during a page miss operation. The interface logic 16 therefore must know when the address on the address bus 24 represents a page hit or a page miss. State machine 60 in FIG. 3 makes this determination, and during a page miss operation, activates the AHOLD pin 76 on the processor 12 to force the processor to relinquish control of the address bus 24. During a page hit, the AHOLD pin 76 is not activated in the embodiment of FIG. 3.

Like the embodiment of FIG. 2, the interface logic 16 of FIG. 3 is inexpensive because the need for the output port 38 (of FIG. 1) is eliminated. As in the embodiment of FIG. 2, the interface logic 16 of FIG. 3 provides these advantages while still retaining full compatibility with the processor 12, the memory unit 18, and their associated protocols.

The interface bus 69 in the embodiment of FIG. 2 is shown connected to the row address bus 66, whereas the interface bus 69 in the embodiment of FIG. 3 is shown connected to the column address bus 65. Efficiency is the reason underlying the differing connections. In the non-paging implementation of FIG. 2, it is more efficient to connect the interface bus 69 to the row portion of the address bus. This allows each memory cycle to proceed immediately on the assertion of the address by the processor 12 because the row address can be immediately driven to the memory unit 18 over the interface bus 69. Although the implementations shown in FIGS. 2 and 3 are preferred, it is possible to configure the systems of FIGS. 2 and 3 in a different manner without departing from the scope of the present invention.

In a paging implementation, on the other hand, it is more efficient to connect the interface bus 69 to the column portion 65 of the address bus 24 because this allows page hit cycles to proceed immediately on the assertion of a page hit address by the processor 12. Although page miss cycles cannot proceed immediately in this implementation, as a practical matter little time is lost because in a page miss situation the processor typically has to wait for the precharge time to elapse before initiating a page miss cycle.

The phrases "row address" and "column address" are used herein merely as labels that designate portions of the address bus 24. These phrases should be interpreted as encompassing any type of multiplexed address scheme, and should not be interpreted as limiting the scope of the present invention to any particular memory unit structure or implementation.

The row and column address busses 66 and 65 are shown in FIG. 2 as having widths of M and N, respectively. Typically, the widths M and N are equal, but such an implementation is not required. All that is required in the implementation shown in FIG. 2 is that the row address bus 66 connected to the interface bus 69 be wide enough to accommodate both the row and column addresses. Thus M should be greater than or equal to N in FIG. 2. In FIG. 3, on the other hand, since the interface bus 69 is connected to the column address bus 65 (rather than to the row address bus 66), the width N of the column address bus 65 should be greater than or equal to the width M of the row address bus 66.

Figure 4:
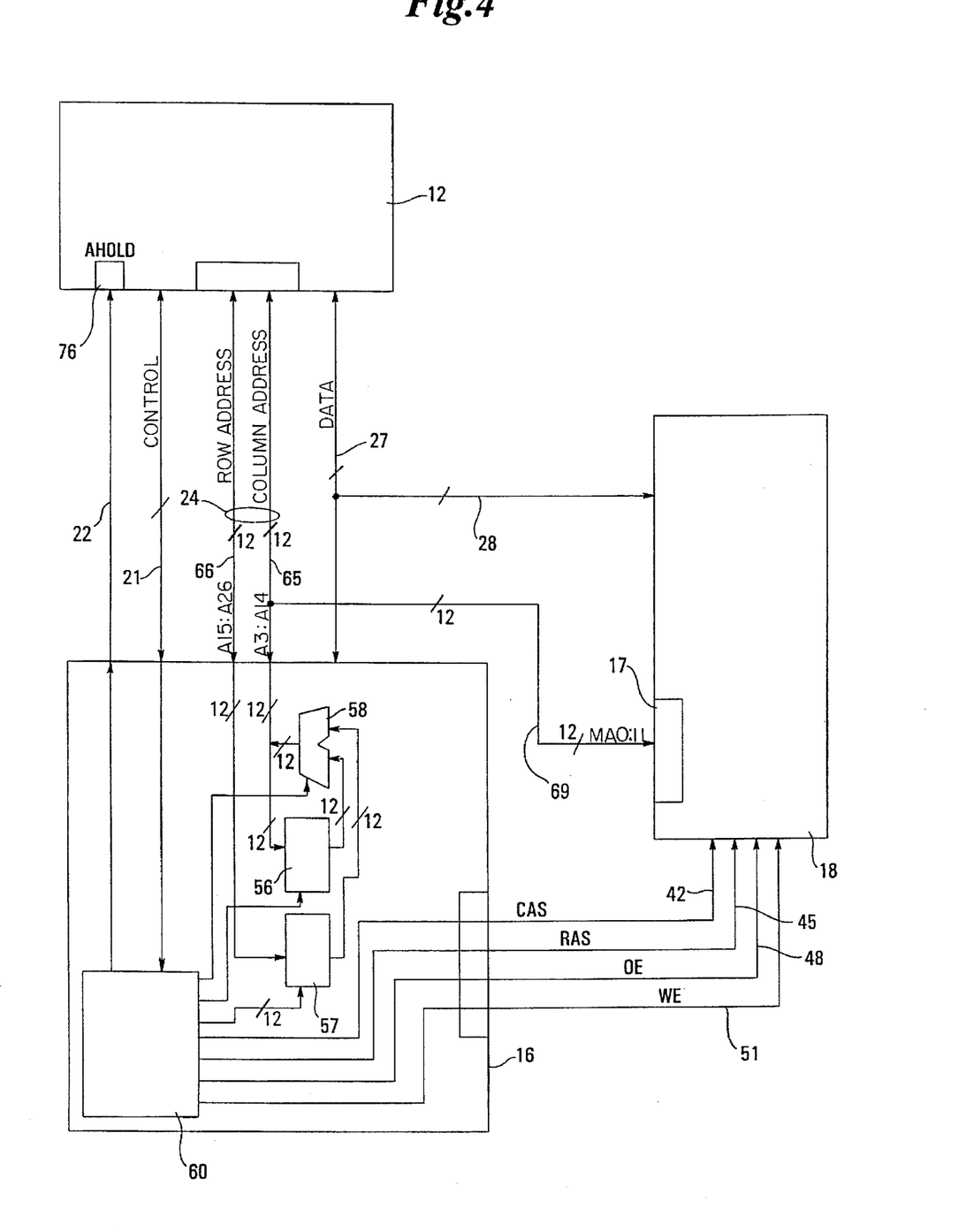
FIGS. 4 and 5 are schematic diagrams of embodiments of the present invention that have burst-mode capability.

In another embodiment of the present invention, shown in FIG. 4, the interface logic 16 is adapted for use with the Pentium™ processor 12 manufactured by the Intel Corporation of Santa Clara, Calif. In this embodiment, the memory unit 18 is standard DRAM memory that is used in page mode. For the purposes of illustrating a specific example, the memory dimensions of memory unit 18 are taken as 16 megabytes×64 bits. These dimensions require that twenty-four bits be used to identify each 64-bit quadword. The column address is the low-order twelve bits of the twenty-four bit address (processor pins A3:A14), and the row address is the high-order twelve bits of the twenty-four bit address (processor pins A15:A26). (The three address pins A0:A2 are not considered part of the twenty-four bit address.)

In FIG. 4, the twelve column lines 65 from the address bus 24 are used by the interface logic 16 and the processor 12 in a manner similar to that described in connection with FIG. 3. During a page miss operation, the interface logic 16 of FIG. 4 stores the row and column addresses and forces the processor 12 to relinquish control of the address bus 24. The interface logic 16 then drives the row and then the column address to the memory unit 18 over the column address bus 65 and thereby also over the interface bus 69. For a page hit operation, the processor 12 directly drives the column address over the column address bus 65 and thereby also over the interface bus 69 to the memory unit 18. Thus, the embodiment of FIG. 4 operates in a manner similar to that of FIG. 3.

The interface logic 16 of FIG. 4 is capable of enabling a burst capability. When the processor 12 issues an address to the DRAM 18, the three other addresses within the four address boundary defined by MA2 to MA11 of the column address are also likely to be subsequently accessed by the processor 12. To effectively reduce access time, the interface logic 16 can automatically access these other three addresses before they are requested by the processor 12. After the first (original) address is accessed, the interface logic 16 asserts the AHOLD command to the processor 12, and de-asserts the CAS control signal 42. The device 58 computes a new address from the original address, and drives this new address over the column address bus 65 and thereby also over the interface bus 69. The CAS control signal is then asserted to strobe the new address to the memory unit 18. This procedure is then repeated for each of the two remaining addresses within the four-byte boundary.

Figure 5:
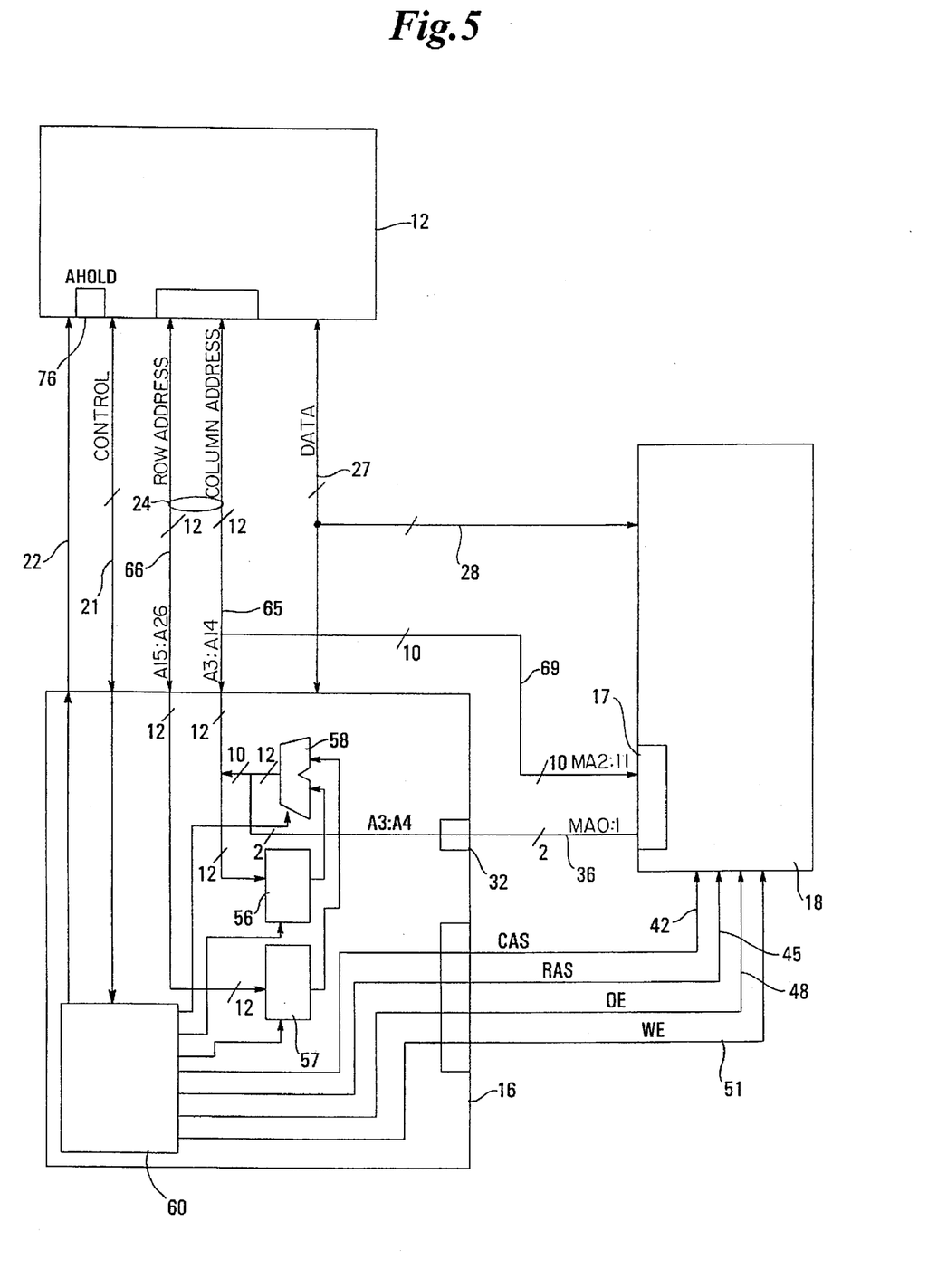

A similar burst mode capability can be implemented as shown in FIG. 5. In FIG. 5, the address bits A3 and A4 (corresponding to MA0 and MA1, respectively) are asserted through a separate port 32 of the interface logic 16. The MA0 and MA1 bits are toggled by the interface logic 16 in burst mode so that the four sixty-four bit quadwords around the original address A3:A26 are bursted to (or from) the memory unit 18. The device 58 computes the new MA0 and MA1 value for each quadword within the four address boundary defined by MA2 to MA11.

In yet another embodiment, the interface logic 16 could further enhance performance by doing a quick decode of the address on the address bus 24 to determine if that address represents any memory access, and if so, a memory unit 18 access could begin with a CAS cycle before the interface logic 16 completes the full decode. The quick decode would be completed before the interface logic 16 determines whether the address on the address bus 24 represents a page hit or a page miss, or even whether the address represents a DRAM access. If the address is later decoded as a page miss or a non-DRAM access, the previously-initiated CAS cycle is terminated. The operation appropriate for the address (e.g., a page miss cycle) is then initiated. But if the address is decoded as a page hit, the interface logic 16 will already be in the process of accessing the DRAM. Thus, page hit cycles can be carried out very quickly by initiating a CAS cycle before the full decode is complete.

Although the present invention has been shown and described with respect to preferred embodiments, various changes and modifications that are obvious to a person skilled in the art to which the invention pertains, even if not shown or specifically described herein, are deemed to lie within the spirit and scope of the invention and the following claims.

What is claimed is:

1. A computer comprising:
   (a) a memory unit having an address port, wherein the memory unit is addressed by
      presenting a row address at the address port,
      removing the row address, and then
      presenting a column address at the address port;
   (b) an address bus which may be divided into a row portion and a column portion;
   (c) an interface bus connected between the row portion of the address bus and the memory unit address port;
   (d) a processor that places an address on the address bus, the address having a row address and a column address, wherein the processor drives the row address over the row portion of the address bus and thereby also over the interface bus to the memory unit address port; and
   (e) interface logic, connected to the processor by the address bus, wherein the interface logic is configured so that it
      stores the column address placed on the address bus by the processor,
      causes the processor to relinquish control of the address bus after the processor has driven the row address to the memory unit, and then
      drives the column address over the row portion of the address bus and thereby also over the interface bus to the memory unit address port.

2. The computer of claim 1, wherein the interface logic is further configured so that it
   strobes the row address to the memory unit by asserting a row address strobe when the row address is presented to the address port; and
   strobes the column address to the memory unit by asserting a column address strobe when the column address is presented to the address port.

3. A computer comprising:
   (a) a memory unit having an address port, wherein a row address identifies a page within the memory unit and a column address identifies a location within the page, wherein the memory unit is addressed in a page miss situation by
      presenting a row address at the address port,
      removing the row address, and then
      presenting a column address at the address port, and
      wherein the memory unit is addressed in a page hit situation by
      presenting a column address at the address port;
   (b) an address bus which may be divided into a row portion and a column portion;
   (c) an interface bus connected between the column portion of the address bus and the memory unit address port;
   (d) a processor that places an address on the address bus, the address having a row address and a column address; and
   (e) interface logic, connected to the processor by the address bus, wherein the interface logic is configured so that during a page miss situation it
      stores the row address and the column address placed on the address bus by the processor,
      causes the processor to relinquish control of the address bus,
      drives the row address over the column portion of the address bus and thereby also over the interface bus to the address port of the memory unit, and then
      drives the column address over the column portion of the address bus and thereby also over the interface bus to the address port of the memory unit.

4. The computer of claim 3, wherein the interface logic is further configured so that during a page miss situation it
   strobes the row address to the memory unit by asserting a row address strobe when the interface logic presents the row address to the address port; and
   strobes the column address to the memory unit by asserting a column address strobe when the interface logic presents the column address to the address port.

5. The computer of claim 4,
   wherein the processor drives the column address over the column portion of the address bus and thereby also over the interface bus to the address port during a page hit situation; and
   wherein the interface logic is further configured so that during a page hit situation it strobes the column address to the memory unit by asserting a column address strobe when the column address is presented to the address port.

6. The computer of claim 5, wherein the interface logic is further configured so that it bursts data from the memory unit that is read from a location in the memory unit defined by the address during read operations by
   causing the processor to relinquish control of the address bus after data is read from a location in the memory unit defined by the address; and
   driving a new column address over the column portion of the address bus and thereby also over the interface bus to the address port of the memory unit, wherein the new column address is computed by toggling at least one low order column address line.

7. The computer of claim 5, wherein the interface logic is further configured so that it bursts data to the memory unit during write operations by
   causing the processor to relinquish control of the address bus after data is written to a location in the memory unit defined by the address; and
   driving a new column address over the column portion of the address bus and thereby also over the interface bus to the address port of the memory unit, wherein the new column address is computed by toggling at least one low order column address line.

8. The computer of claim 5, wherein the interface logic is further configured so that it bursts data from the memory unit during read operations by toggling at least one low order column address line.

9. The computer of claim 5, wherein the interface logic is further configured so that it bursts data to the memory unit during write operations by toggling at least one low order column address line.

10. The computer of claim 5, wherein the column address is strobed to the memory unit before the interface logic fully decodes the address placed on the address bus by the processor.

11. The computer of claim 5, wherein the column address is presented to the memory unit before the interface logic fully decodes the address placed on the address bus by the processor.

12. Interface logic for interfacing a processor to a memory unit, wherein the interface logic is connected to the processor by an address bus, and wherein the memory unit is connected to a row portion of the address bus by an interface bus, the interface logic comprising:
   (a) means for storing a column address placed on the address bus by the processor;

(b) means for causing the processor to relinquish control of the address bus after the row address is presented to the memory unit by the processor; and (c) means for driving the column address over the row portion of the address bus and thereby also over the interface bus to the memory unit after the processor has relinquished control of the address bus.

13. The interface logic of claim 12, further comprising:

(d) means for strobing the row address to the memory unit when the row address is presented to the address port by the processor; and (e) means for strobing the column address to the memory unit when the column address is presented to the address port by the interface logic.

14. Interface logic for interfacing a processor to a memory unit, wherein the interface logic is connected to the processor by an address bus, and wherein the memory unit is connected to a row portion of the address bus by an interface bus, the interface logic comprising:

(a) a storage device, wherein the storage device stores a column address placed on the address bus by the processor;

(b) a state machine that is configured to cause the processor to relinquish control of the address bus after the row address is presented to the memory unit by the processor; and (c) driving logic, wherein the driving logic is configured so that it drives the column address over the row portion of the address bus and then over the interface bus to the memory unit after the processor has relinquished control of the address bus.

15. Interface logic for interfacing a processor to a memory unit, wherein the interface logic is connected to the processor by an address bus, and wherein the memory unit is connected to a column portion of the address bus by an interface bus, the interface logic comprising:

(a) means for determining whether an address placed on the address bus by the processor represents a page hit or a page miss;

(b) means for storing a row address and a column address placed on the address bus by the processor;

(c) means for causing the processor to relinquish control of the address bus;

(d) means for driving the row address over the column portion of the address bus and thereby also over the interface bus to the memory unit; and (e) means for driving the column address over the column portion of the address bus and thereby also over the interface bus to the address port of the memory unit.

16. The interface logic of claim 15, further comprising:

(f) means for strobing the row address to the memory unit when the row address is presented to the address port by the interface logic; and (g) means for strobing the column address to the memory unit when the column address is presented to the address port by the interface logic.

17. Interface logic for interfacing a processor to a memory unit, wherein the interface logic is connected to the processor by an address bus, and wherein the memory unit is connected to a column portion of the address bus by an interface bus, the interface logic comprising:

(a) a state machine, wherein the state machine is configured so that it determines whether an address placed on the address bus by the processor represents a page hit or a page miss, and causes the processor to relinquish control of the address bus in response to a page miss situation;

(b) a storage device, wherein the storage device stores the address as a row address and a column address;

(d) driving logic, wherein the driving logic is configured so that it drives the row address over the column portion of the address bus and thereby also over the interface bus to the memory unit, and drives the column address over the column portion of the address bus and thereby also over the interface bus to the memory unit.

18. The interface logic of claim 17, wherein the state machine is further configured so that it strobes the row address to the memory unit when the row address is presented to the memory unit by the interface logic; and strobes the column address to the memory unit when the column address is presented to the memory unit by the interface logic.

19. A method of addressing a memory unit in a system comprising a processor, an address bus, interface logic, and an interface bus, wherein the address bus is connected between the processor and the interface logic, and wherein the interface bus is connected between the memory unit and a row portion of the address bus;

the method comprising the steps of:

(a) storing in the interface logic a column address placed on the address bus by the processor;

(b) causing the processor to relinquish control of the address bus after the row address is presented to the memory unit by the processor;

(c) driving the column address from the interface logic over the row portion of the address bus and thereby also over the interface bus to the memory unit after the processor has relinquished control of the address bus.

20. The method of claim 19, further comprising the steps of:

(d) strobing the row address to the memory unit when the row address is presented to the memory unit by the processor; and (e) strobing the column address to the memory unit when the column address is presented to the memory unit by the interface logic.

21. A method of addressing a memory unit in a page miss situation in a system comprising a processor, an address bus, interface logic, and an interface bus, wherein the address bus is connected between the processor and the interface logic, and wherein the interface bus is connected between the memory unit and a column portion of the address bus;

the method comprising the steps of:

(a) storing in the interface logic a row address and a column address;

(b) causing the processor to relinquish control of the address bus;

(c) driving the row address from the interface logic over the column portion of the address bus and thereby also over the interface bus to the memory unit after the processor has relinquished control of the address bus;

(d) removing the row address; and then (e) driving the column address from the interface logic over the column portion of the address bus and thereby also over the interface bus to the memory unit.

22. The method of claim 21, further comprising the steps of:

(f) strobing the row address to the memory unit when the row address is presented to the memory unit by the interface logic; and (g) strobing the column address to the memory unit when the column address is presented to the memory unit by the interface logic.

* * * * *